United States Patent
Sakakura

(10) Patent No.: US 10,225,133 B2
(45) Date of Patent: Mar. 5, 2019

(54) MANAGEMENT SYSTEM FOR A CONTROL SYSTEM, GATEWAY DEVICE, SERVER DEVICE, MANAGEMENT METHOD, GATEWAY METHOD, AND MANAGEMENT PROCESS EXECUTION METHOD

(71) Applicant: Mitsubishi Electric Corporation, Tokyo (JP)

(72) Inventor: Takashi Sakakura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 236 days.

(21) Appl. No.: 15/118,398

(22) PCT Filed: Mar. 17, 2014

(86) PCT No.: PCT/JP2014/057162
§ 371 (c)(1),
(2) Date: Aug. 11, 2016

(87) PCT Pub. No.: WO2015/140908
PCT Pub. Date: Sep. 24, 2015

(65) Prior Publication Data
US 2017/0134212 A1    May 11, 2017

(51) Int. Cl.
*H04L 12/24* (2006.01)
*H04W 76/19* (2018.01)
(Continued)

(52) U.S. Cl.
CPC .......... *H04L 41/0273* (2013.01); *G08C 17/00* (2013.01); *H04L 41/0246* (2013.01);
(Continued)

(58) Field of Classification Search
CPC .......... G06F 17/30707; H04L 41/0253; H04L 41/0273; H04L 51/04; H04L 63/08;
(Continued)

(56) References Cited

U.S. PATENT DOCUMENTS

2003/0177440 A1    9/2003  Kegoya et al.
2006/0179120 A1    8/2006  Kegoya et al.
(Continued)

FOREIGN PATENT DOCUMENTS

CN           1577342 A      2/2005
CN         101335674 A     12/2008
(Continued)

*Primary Examiner* — Le H Luu
(74) *Attorney, Agent, or Firm* — Birch, Stewart, Kolasch & Birch, LLP

(57) ABSTRACT

A gateway transmits a communication switch request to a communication control unit by HTTP communication. The communication switch request serves to switch connection with a data center from HTTP communication to WebSocket communication. The communication control unit, when the communication switch request is received from the gateway, switches communication with the gateway device to WebSocket communication. A mobile terminal transmits a management execution request requesting execution of a management process of a PLC, to the data center. The communication control unit transmits a session establishing request requesting establishment of a session with the PLC, to the gateway by WebSocket communication based on the received management execution request.

18 Claims, 12 Drawing Sheets

(51) Int. Cl.
*H04W 76/20* (2018.01)
*H04L 29/06* (2006.01)
*H04L 29/08* (2006.01)
*G08C 17/00* (2006.01)

(52) U.S. Cl.
CPC .............. *H04L 63/02* (2013.01); *H04L 67/02* (2013.01); *H04L 67/12* (2013.01); *H04W 76/19* (2018.02); *H04W 76/20* (2018.02); *G08C 2201/42* (2013.01)

(58) Field of Classification Search
CPC .............. H04L 65/1006; H04L 65/1016; H04L 65/1023; H04L 67/02; H04L 9/083; H04L 41/0246; H04L 67/12; H04L 63/02; H04M 15/06; H04W 28/0268; H04W 76/19; H04W 76/20; G08C 17/00; G08C 2201/42
See application file for complete search history.

(56) References Cited

U.S. PATENT DOCUMENTS

| | | | |
|---|---|---|---|
| 2006/0179121 A1 | 8/2006 | Kegoya et al. | |
| 2006/0190624 A1 | 8/2006 | Kegoya et al. | |
| 2007/0043868 A1* | 2/2007 | Kumar | G06F 17/30707 709/226 |
| 2007/0116228 A1* | 5/2007 | Schneider | H04M 15/06 379/211.01 |
| 2008/0298268 A1 | 12/2008 | Chiba et al. | |
| 2009/0013082 A1 | 1/2009 | Nara | |
| 2010/0223463 A1* | 9/2010 | Sakaguchi | H04L 9/083 713/168 |
| 2013/0018945 A1* | 1/2013 | Vendrow | H04L 65/1006 709/203 |
| 2013/0097239 A1 | 4/2013 | Brown et al. | |
| 2014/0005809 A1 | 1/2014 | Frei et al. | |
| 2014/0005810 A1 | 1/2014 | Frei et al. | |
| 2014/0005851 A1 | 1/2014 | Frei et al. | |
| 2014/0006506 A1 | 1/2014 | Frei et al. | |
| 2014/0006552 A1 | 1/2014 | Frei et al. | |
| 2014/0006605 A1 | 1/2014 | Frei et al. | |
| 2014/0006660 A1 | 1/2014 | Frei et al. | |
| 2014/0044123 A1* | 2/2014 | Lawson | H04L 65/1023 370/352 |
| 2014/0143374 A1* | 5/2014 | Huang | H04L 41/0253 709/217 |
| 2014/0207957 A1* | 7/2014 | Zhang | H04L 67/02 709/227 |
| 2014/0219167 A1* | 8/2014 | Santhanam | H04W 28/0268 370/328 |
| 2014/0280995 A1* | 9/2014 | Ezell | H04L 65/1016 709/229 |
| 2014/0282903 A1* | 9/2014 | Singh | H04L 63/08 726/4 |
| 2015/0046534 A1 | 2/2015 | Frei et al. | |
| 2015/0172228 A1* | 6/2015 | Zalepa | H04L 51/04 709/206 |
| 2016/0021040 A1 | 1/2016 | Frei et al. | |
| 2016/0043926 A1 | 2/2016 | Frei et al. | |
| 2017/0134212 A1* | 5/2017 | Sakakura | H04L 41/0273 |

FOREIGN PATENT DOCUMENTS

| | | |
|---|---|---|
| JP | 62-266604 A | 11/1987 |
| JP | 2001-175310 A | 6/2001 |
| JP | 2001-282323 A | 10/2001 |
| JP | 2002-41134 A | 2/2002 |
| JP | 2002-189508 A | 7/2002 |
| JP | 2004-145716 A | 5/2004 |
| JP | 2005-33239 A | 2/2005 |
| JP | 2008-77535 A | 4/2008 |
| JP | 2008-301267 A | 12/2008 |
| JP | 2010-26948 A | 2/2010 |
| JP | 2010-286955 A | 12/2010 |
| JP | 2013-105301 A | 5/2013 |
| TW | 201404183 A | 1/2014 |

* cited by examiner

MANAGEMENT SYSTEM FOR A CONTROL SYSTEM, GATEWAY DEVICE, SERVER DEVICE, MANAGEMENT METHOD, GATEWAY METHOD, AND MANAGEMENT PROCESS EXECUTION METHOD

TECHNICAL FIELD

The present invention relates to: a management system which manages a control system; a gateway device; a server device; a management method; a gateway method; and a management process execution method. In particular, the present invention relates to: a management system for a control system applied to FA (Factory Automation), PA (Process Automation), and so on; a gateway device; a server device; a management method; a gateway method; and a management process execution method.

BACKGROUND ART

Cloud computing services which perform all modes of computer resource providing services are becoming popular rapidly against the development of an IP (Internet Protocol) communication network as the background.

The cloud computing services include a computer resource lease service, an application use service, and so on. According to the computer resource lease service, the service provider builds a data center composed of computer clusters at a suitable location and leases out the computer resources of the data center. The application use service allows use of the applications of the data center.

As the system is operated by the data center, the user can use the system of any mode for small initial cost.

Also, collaborative work by a plurality of users residing away from each other becomes possible. Since a plurality of pieces of replica data are stored, the data center is resistant to disaster.

In this manner, the cloud computing services provide the user with a convenience that a conventional mode having information systems separately for the business locations cannot offer.

The FA system and the PA system are each constituted of various types of networks, a controller typically represented by a programmable logic controller (to be referred to as PLC hereinafter), an JO (input/output interface), various types of devices, and so on and are accordingly difficult to manage by unitary management. In the present state, the control system applied to the FA system or PA system is managed on site with using a control terminal.

Patent Literature 1 discloses the configuration of a control system that can update a control program for a PLC from a remote location by employing conventional control program creating software which can output only to a serial port.

CITATION LIST

Patent Literature

Patent Literature 1: JP 2001-282323

SUMMARY OF INVENTION

Technical Problem

The technique of Patent Literature 1 merely converts 1-to-1 connection of a PLC and a control terminal into Ethernet (registered trademark) connection.

The technique of Patent Literature 1 has a problem that it cannot manage individual PLCs unitarily by cloud computing.

The present invention has been made to solve the above problem and provides: a management system which can manage a control system from a remote location or at a site where an FA system or PA system is installed, by using a mobile terminal; a management method; and a program.

Solution to Problem

A management system includes:
a gateway device connected to a controller; and
a server device to receive a management execution request requesting execution of a management process of managing the controller, to generate, based on the received management execution request, designation information designating the controller, and to transmit a session establishing request with the designation information being included therein, requesting establishment of a session with the controller, to the gateway device.

Advantageous Effects of Invention

A management system according to the present invention includes a gateway device connected to a controller, and a server device to receive a management execution request requesting execution of a management process of managing the controller, to generate, based on the received management execution request, designation information designating the controller, and to transmit a session establishing request with the designation information being included therein, requesting establishment of a session with the controller, to the gateway device. Therefore, the management process of the controller can be executed even at a remote location far from the site where the controller is installed.

DESCRIPTION OF EMBODIMENTS

Embodiment 1

Figure 1:
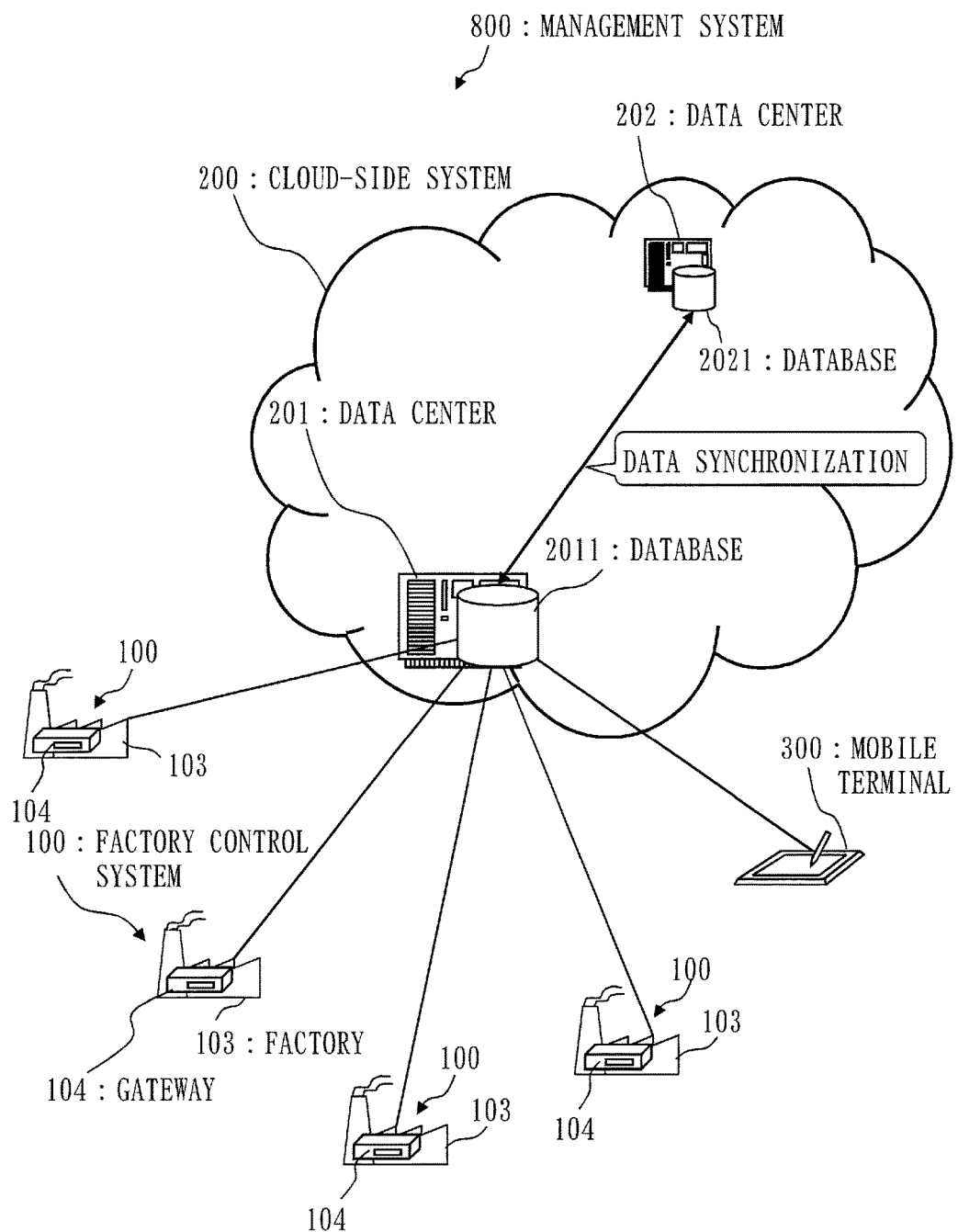
FIG. 1 is a schematic diagram for explaining the outline of a management system according to Embodiment 1.

FIG. 1 is a schematic diagram for explaining the outline of a management system 800 according to Embodiment 1. The outline of the management system 800 according to this embodiment will be explained with referring to FIG. 1.

The management system 800 is constituted of a cloud-side system 200, a plurality of factory control systems 100, and a mobile terminal 300. The cloud-side system 200 includes a data center 201 and a data center 202.

The mobile terminal 300 (an example of a terminal device) is, for example, a tablet terminal or a smart phone.

Each of the plurality of factory control systems 100 is connected to the cloud-side system 200 via a network such as a public IP network. The mobile terminal 300 is connected to the cloud-side system 200 via a network such as a public IP network. More specifically, each of the plurality of factory control systems 100 is connected to the data center 201 and the data center 202 via a network such as a public IP network. The mobile terminal 300 is connected to the data center 201 and the data center 202 via a network such as a public IP network.

Each factory control system 100 includes a gateway 104 (an example of a gateway device). The factory control system 100 is a control system which is installed in a factory 103 and controls a controller provided to the factory 103.

The cloud-side system 200 includes the data center 201 and the data center 202. The data center 201 includes a database 2011. The data center 202 includes a database 2021. The data center 201 and data center 202 may be simply called a data center. The database 2011 and the database 2021 may be simply called a database.

The data center is an example of a server device. The data center may be constituted of a single server device, or may be a server system constituted of a plurality of server devices such as a file server and an authentication server.

Every piece of information necessary for factory operation, such as design information of a production facility of the factory 103, simulation information which verifies the authenticity of the design, layout information, production result, production schedule, procurement information, and operation information is stored in the database 2011 of the data center 201.

Regarding other factories 103 illustrated in FIG. 1, every piece of information necessary for factory operation is similarly stored in the database 2011 of the data center 201.

The data center 202 is connected to a public IP network, as the data center 201 is. A duplicate of data managed by the database 2011 of the data center 201 is stored in the database 2021 of the data center 202. Data update occurring in the database 2011 is reflected in the database 2021. More specifically, the data center 201 and the data center 202 form a multiple configuration. Although the management system 800 of this embodiment employs a multiple-system configuration constituted of the data center 201 and data center 202, the management system 800 may employ any configuration such as a triple-system configuration or quadruple-system configuration as far as it is a multiple-system configuration.

As described above, in the management system 800 according to this embodiment, the database 2011 and the database 2021 which manages the duplicate data of the data stored in the database 2011 form a multiple-system configuration, which is mainly due to the following two reasons.

(1) Even if one data center (database) becomes inoperative due to a natural disaster or the like, the factory operation can continue by using another data center.

(2) By using a data center that is nearer geographically, the communication delay between the factory and the data center can be reduced.

The gateway 104 is arranged in each factory 103. The gateway 104 is connected to the controller provided to the factory control system 100 via, for example, a wireless LAN (local area network). Both the data center and the factory control system 100 are protected by a multiple fire wall. The gateway 104 is also arranged inside at least one fire wall installed in the factory control system 100 (factory 103). The multiple fire wall serves to allow only HTTP (Hypertext Transfer Protocol) to pass through it so that burglary into and data leakage from the factory control system 100 is prevented.

The gateway 104 is connected to the data center by HTTP communication (an example of a first communication scheme) which transmits a request to the data center unidirectionally.

The gateway 104 is connected to the data center which is the nearest geographically by HTTP communication that can pass through the fire wall, and upgrades HTTP connection to WebSocket connection (an example of a second communication scheme).

HTTP connection allows transmission/reception of character string data only between the client (that is, the factory control system 100 side) and the server (data center side).

With WebSocket connection, binary data or UTF-8 data can be used as the data. With WebSocket connection, the server (data center side) can push a message to the client (factory control system 100 side). WebSocket is the name of a communication standard that enables such WebSocket connection.

For example, when the gateway 104 is connected to the data center for the first time, the gateway 104 transmits a request (communication switch request) requesting upgrade to WebSocket connection. Alternatively, the gateway 104 may accept an execution permission request for permitting execution of a management process by the data center based on the request (management execution request) for a controller management process transmitted from the mobile terminal 300, and upon acceptance of the execution permission request, may transmit the communication switch request.

The gateway 104 of the factory control system 100 is connected to the data center through an authentication process. If attribute information of the factory 103 such as factory owner information, factory address, in-factory network configuration, in-factory instruments, and factory layout are not registered to the database on the data center yet, the gateway 104 registers these pieces of attribute information of the factory 103. If these pieces of attribute information of the factory 103 have already been registered, the gateway 104 registers information indicating that the gateway 104 has been connected, to the database.

Figure 2:
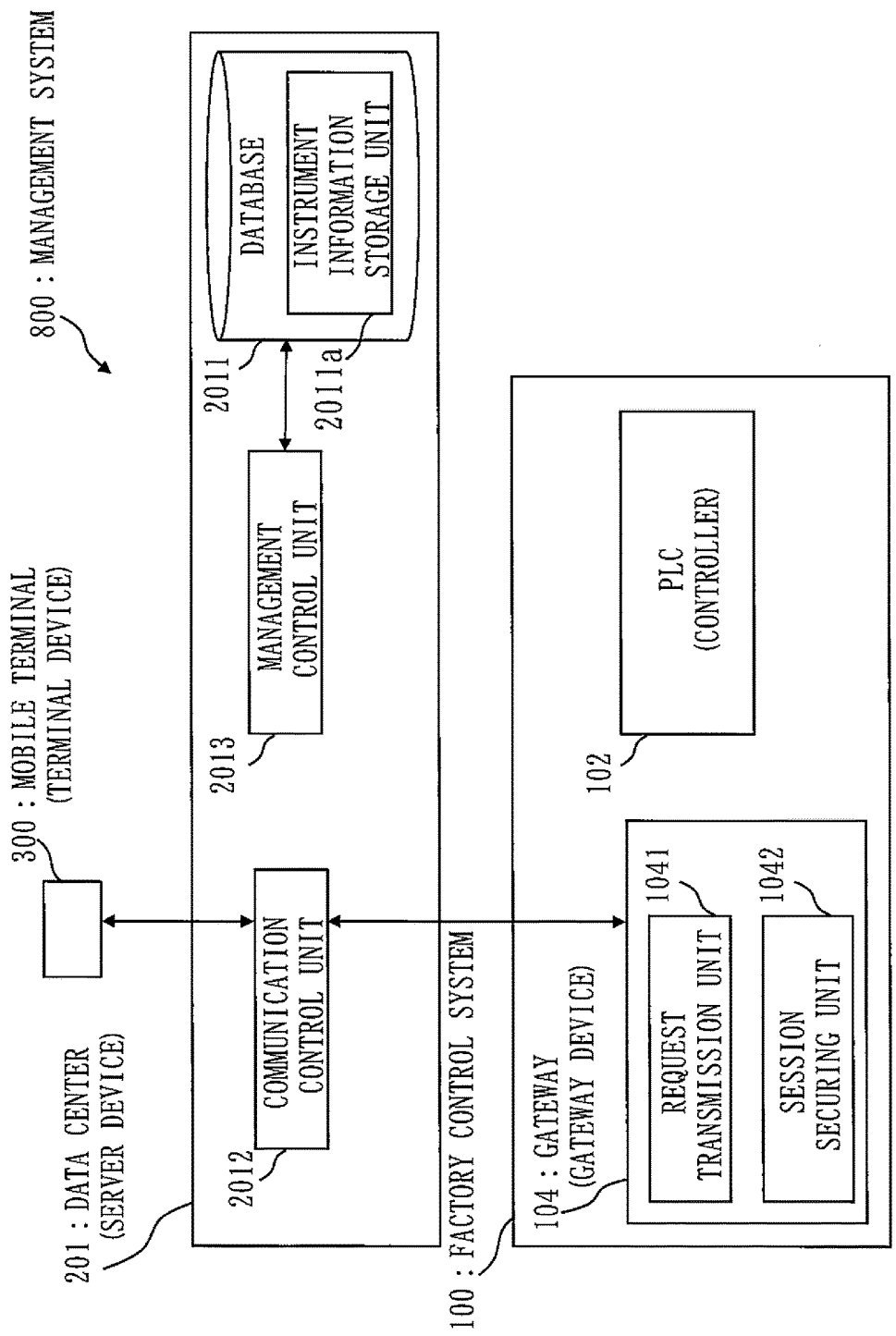
FIG. 2 is a block configuration diagram illustrating an example of a function block of the management system according to Embodiment 1.
Figure 3:
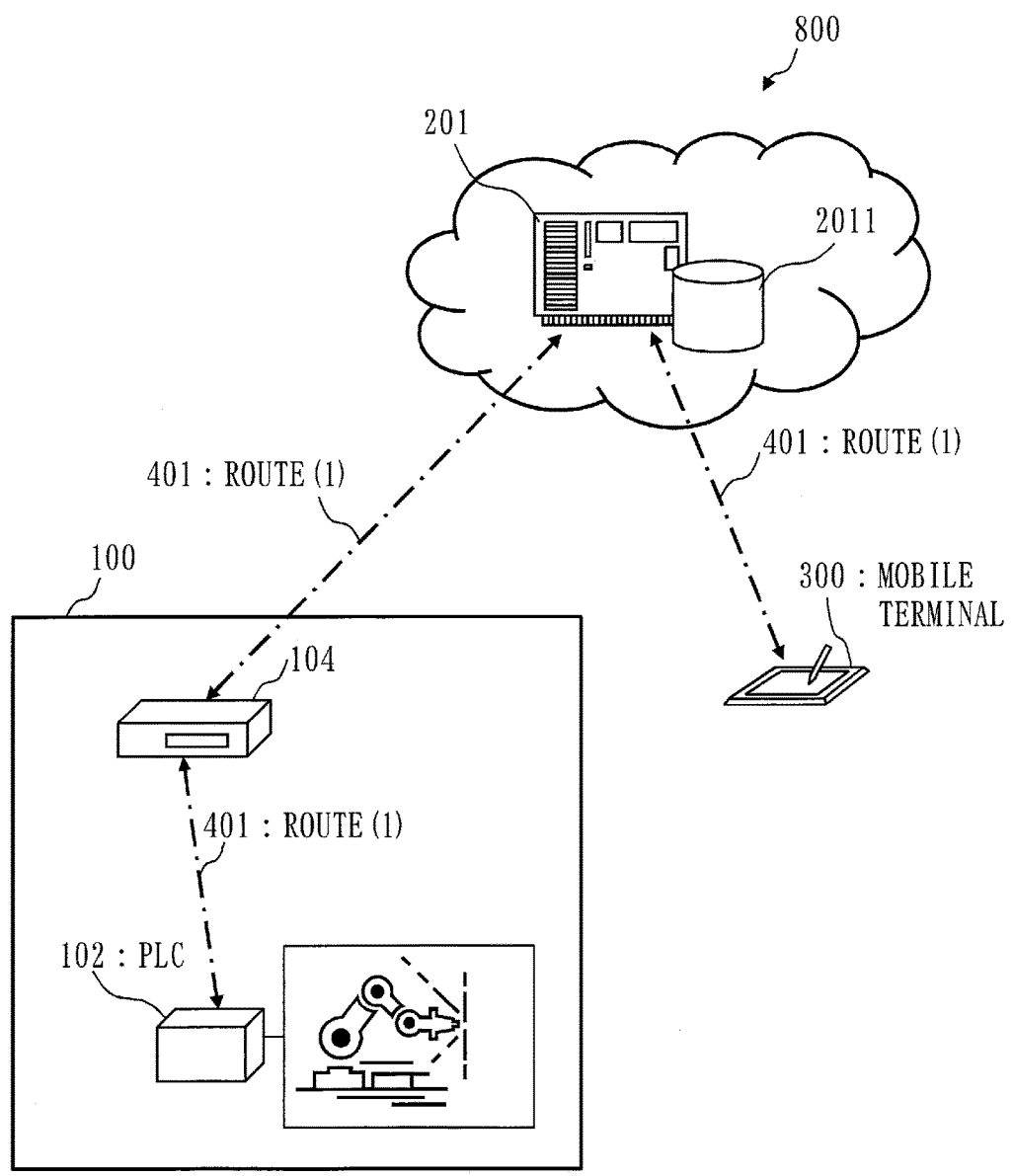
FIG. 3 is a schematic diagram for explaining an example of a function of the management system according to Embodiment 1.
Figure 4:
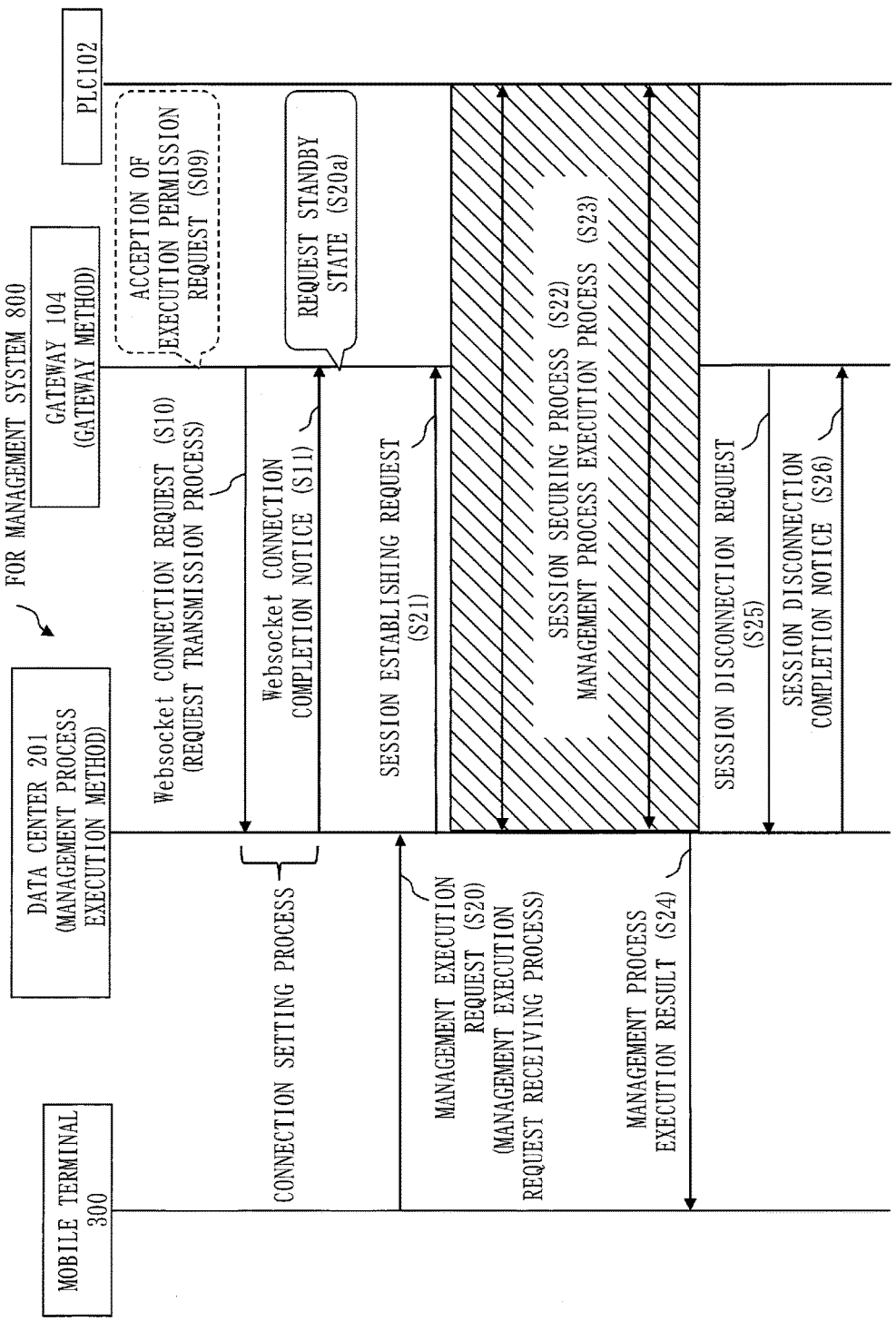
FIG. 4 is a sequence diagram for explaining an example of an operation of the management system according to Embodiment 1.
Figure 5:
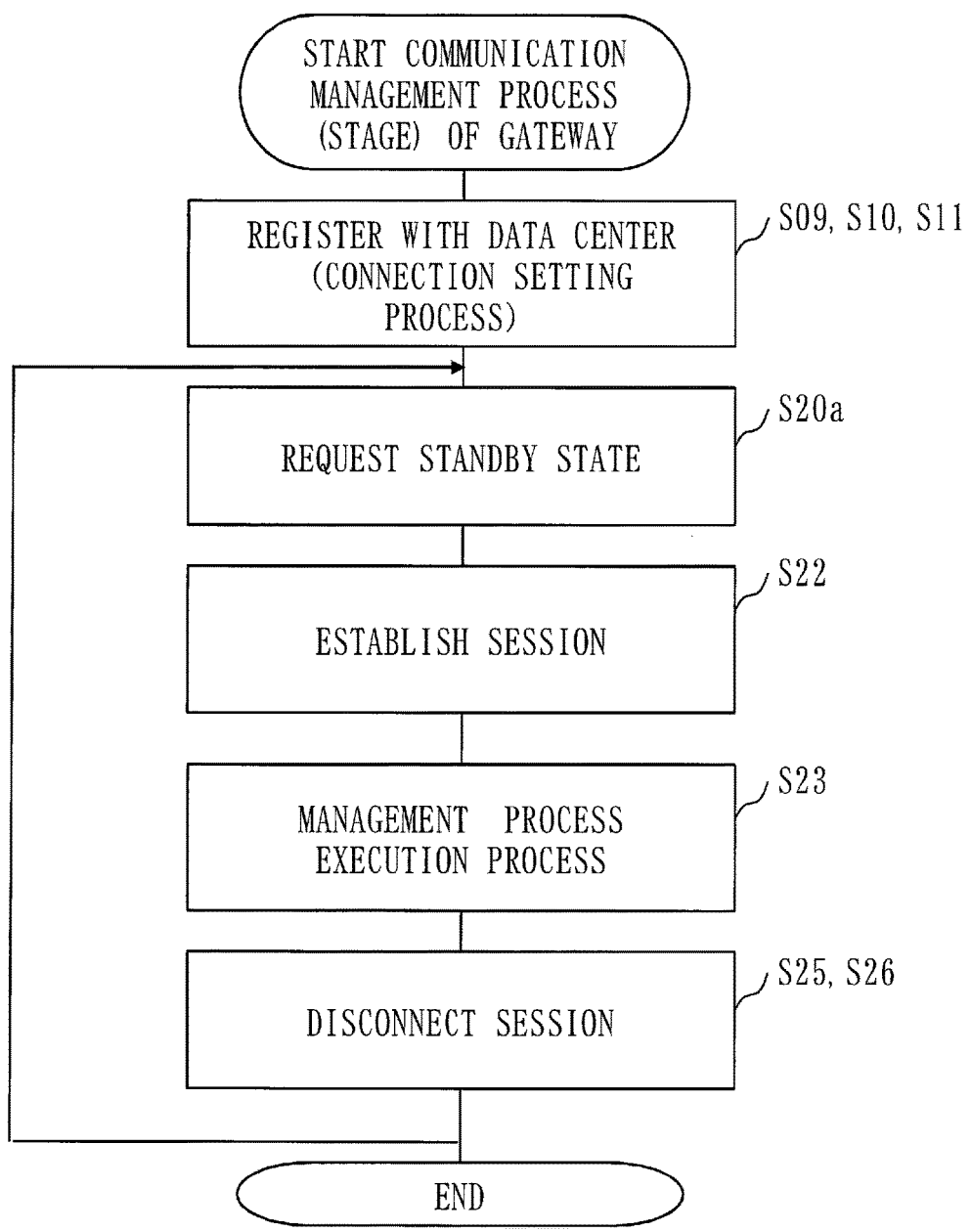
FIG. 5 is a flowchart illustrating an example of an operation of a communication management process of a gateway according to Embodiment 1.

FIG. 2 is a block configuration diagram illustrating an example of a function block of the management system 800 according to this embodiment. FIG. 3 is a schematic diagram for explaining an example of a function of the management system 800 according to this embodiment. FIG. 4 is a sequence diagram for explaining an example of an operation of the management system 800 according to this embodiment. FIG. 5 is a flowchart illustrating an example of an operation of a communication management process of the gateway 104 according to this embodiment.

An example of the operation of the management process (stage) of the management system 800 according to this embodiment will be described with referring to FIGS. 2 to 5.

As illustrated in FIG. 2, the data center 201 includes a communication control unit 2012 and a management control unit 2013, in addition to the configuration described above.

The factory control system 100 includes a PLC 102 (an example of the controller) which controls the production facility, in addition to the configuration described above. The gateway 104 includes a request transmission unit 1041 and a session securing unit 1042. The gateway 104 is connected to the PLC 102. The gateway 104 includes a controller connecting unit (not illustrated) necessary for connection with the controller such as the PLC 102.

Note that the configuration of the data center applies to a data center (for example, the data center 202) other than the data center 201.

As illustrated in FIG. 3, the user manages the factory control system 100 (control system) installed in the factory 103, from the mobile terminal 300 via the data center 201. The mainstream of the mobile terminal 300 typically represented by the recent tablet terminal includes a wireless LAN, a Bluetooth (registered trademark), and IP connection operating via the wireless LAN and the Bluetooth, in addition to IP connection operating via the mobile network.

When the user manages the factory control system 100 with the mobile terminal 300 from the outside of the factory 103 via the data center, the mobile terminal 300 which the user manipulates for the management need not be a tablet terminal as described above. The mobile terminal 300 may be of any type as far as it can be IP-connected to the data center. The user connects to the data center from the mobile terminal 300 and manages and operates the factory control system 100. From the mobile terminal 300, the user requests the data center to execute monitoring of the PLC 102 which controls the production facility in the factory 103 and to alter data, for example.

The operation of the mobile terminal 300 manipulated by the user to execute the management process of the factory control system 100 from the outside of the factory 103 via the data center will be described with referring to FIGS. 4 and 5. The management process (management method) of the factory control system 100 includes the operation (gateway process, gateway method) of the gateway 104 and the operation (management process execution process, management process execution method) of the data center 201. FIG. 5 is a flowchart for explaining mainly the operation of the gateway 104.

As described above, first, the gateway 104 connects to the geographically nearest data center by HTTP that enables transmission through the fire wall, and upgrades the HTTP connection to the WebSocket connection. Note that the data center that is geographically the nearest to the factory 103 is the data center 201.

<Connection Setting Process: S09, S10, S11>

First, when the factory control system 100 is connected to the cloud-side system 200, the request transmission unit 1041 of the gateway 104, by using the HTTP communication (an example of the first communication scheme), transmits the communication switch request (WebSocket connection request) for switching from the HTTP communication to the WebSocket communication (S10) (request transmission process), to the data center 201. Upon reception of the communication switch request, the communication control unit 2012 of the data center 201 switches the communication with the gateway 104 from the HTTP communication to the WebSocket communication, and transmits a WebSocket connection completion notice to the gateway 104 (S11).

Thus, a WebSocket communication becomes possible between the data center 201 and the gateway 104.

As described above, the gateway 104 may accept an execution permission request for permitting execution of the management process by the data center (S09), and upon acceptance of the execution permission request, may transmit the communication switch request.

The gateway 104 grasps profile information of the facility of the factory 103 entirely. The profile information is, for example, factory owner information, factory address, in-factory network configuration, instrument attribute information such as configuration information of instruments in the factory and the like, as well as factory attribute information of the layout and the like of the factory 103. An instrument identifier which identifies a controller is correlated to the instrument attribute information. When the gateway 104 is connected to the data center, the gateway 104 executes registration, update, or deletion of the profile information on the database of the data center connected.

For example, the gateway 104 transmits the instrument identifier which identifies the controller and the instrument attribute information which indicates the attribute of the controller. The data center stores the instrument identifier and the instrument attribute information transmitted from the gateway 104, to an instrument information storage unit 2011a of the database in correlation to each other (see FIG. 2). The instrument identifier and the instrument attribute information are used by the management control unit 2013 of the data center in specifying the controller.

In this manner, the gateway 104 transmits geographic information and the profile information of the facility of the controller to the data center and secures a communication route to the data center.

When the connection setting process with the data center 201 is ended, the gateway 104 is set in a request standby state (520a).

<Management Execution Request Receiving Process: S20>

Then, the communication control unit 2012 of the data center 201 receives a management execution request (management operation) for the factory control system 100 from the mobile terminal 300 (S20). Note that the communication control unit 2012 receives the management execution request that requests execution of monitoring the PLC 102 and execution of the management process such as alteration of the program.

When the communication control unit 2012 of the data center 201 receives the management execution request, the management control unit 2013 specifies the factory 103 (factory control system 100), being a destination, based on the received management execution request. The communication control unit 2012 transmits a session establishing request to the gateway 104 of the factory 103 specified by the management control unit 2013 (S21).

For example, assume that in the factory control system 100, the PLC 102 is a controller that controls the subsystem of the production facility in the factory 103. Also assume that the management execution request includes destination information indicating that the target of the management execution request of the user is the factory 103. The destination information is, for example, instrument attribute information concerning the controller, and factory attribute information concerning the factory.

Based on the destination information included in the management execution request, the management control unit 2013 specifies a factory ID that identifies the factory 103, in the database 2011. Based on the specified factory ID, the management control unit 2013 specifies (designates) the gateway 104 of the factory control system 100 of the factory 103 where the PLC 102 is installed, in the database 2011. Based on the specified factory ID, the management control unit 2013 also generates (acquires) route information (an example of the designation information) of the route to the PLC 102 and attribute information (an example of the designation information) from the database 2011.

The communication control unit 2012 generates a session establishing request including the route information of the route to the PLC 102 and the attribute information which are acquired by the management control unit 2013, and so on, and sends the generated session establishing request to the WebSocket connection whose connection setting has been completed in S11 (S21).

<Session Securing Process: S22>

The session securing unit 1042 of the gateway 104 accepts the route information of the route to the PLC 102, the attribute information, and so on included in the session establishing request, and mediates the communication between the PLC 102 and the data center 201. Namely, the gateway 104 establishes a session between the PLC 102 and the data center 201 (S22).

<Management Process Execution Process: S23>

When the session is established between the PLC 102 and the data center 201, the management control unit 2013 of the data center 201 communicates with the PLC 102 via the communication control unit 2012 and the gateway 104, and executes a management process based on the management execution request. The management process is a process such as execution of monitoring the PLC 102 and alteration of the program, as described above.

A practical example of the management process of the management system 800 will be described hereinbelow.

For example, the mobile terminal 300 connects to the data center 201 by a unique identifier PLC ID of the PLC 102 (controller) and transmits a request for alteration of the program in the PLC 102, as a management execution request. The management control unit 2013 of the data center 201, by using the profile information (attribute information) stored in the database 2011, of the PLC 102, provides a controller-use control program engineering environment of the PLC 102 to the mobile terminal 300. The mobile terminal 300, by using the controller-use control program engineering atmosphere, executes an alteration process of the program in the PLC 102, as a management process.

The mobile terminal 300 transmits writing or reading of the control program or acquisition of status information, in a desired PLC 102 to the data center 201 as a management execution request. The management control unit 2013 of the data center 201 specifies a corresponding gateway 104 based on the unique identifier PLC ID of the PLC 102 (controller). The management control unit 2013 of the data center 201 executes writing or reading of the control program or acquisition of the status information, in a desired programmable controller (PLC 102), as a management process via the specified gateway 104.

The management control unit 2013 receives a management process execution result, being the execution result of the management control process, via the gateway 104 and the communication control unit 2012. Upon reception of the management process execution result, the management control unit 2013 transmits the received management process execution result to the mobile terminal 300 (S24).

When communication is to take place between the PLC 102 and the data center 201, the gateway 104 secures a new WebSocket connection between the PLC 102 and the data center 201 based on the PLC ID of the PLC 102, and uses the new WebSocket connection as the communication route between the PLC 102 and the data center 201. More specifically, the gateway 104, upon reception of a data write request for a programmable controller (PLC 102) subordinate to the gateway 104, or a data read request from a programmable controller (PLC 102), requests a communication session dedicated to this request from the data center 201 and secures the dedicated communication session.

The session between the PLC 102 and the data center 201 is maintained until it becomes unnecessary. More specifically, when the management control process between the PLC 102 and the management control unit 2013 is ended, the gateway 104 transmits a session disconnection request to the communication control unit 2012 (S25).

Upon reception of the session disconnection request from the gateway 104, the communication control unit 2012 disconnects the session and transmits a session disconnection completion notice to the gateway 104 (S26).

The process of S20 to S25 described above indicates a management control operation of the factory control system 100 along a route (1) 401 illustrated in FIG. 3.

So far an example of the management process (stage) in the management system 800 has been described.

The mobile terminal 300 may transmit a request for activating execution of a desired service at the data center 201, as a management execution request. In this case, the data center 201 can continue execution of the service even when the mobile terminal 300 is in a disconnected state, that is, after the session is closed. If necessary, the data center 201 may be able to call the gateway 104 serving to execute the service, an instrument connected to this gateway 104, and the mobile terminal 300 that has made the service issued.

Figure 6:
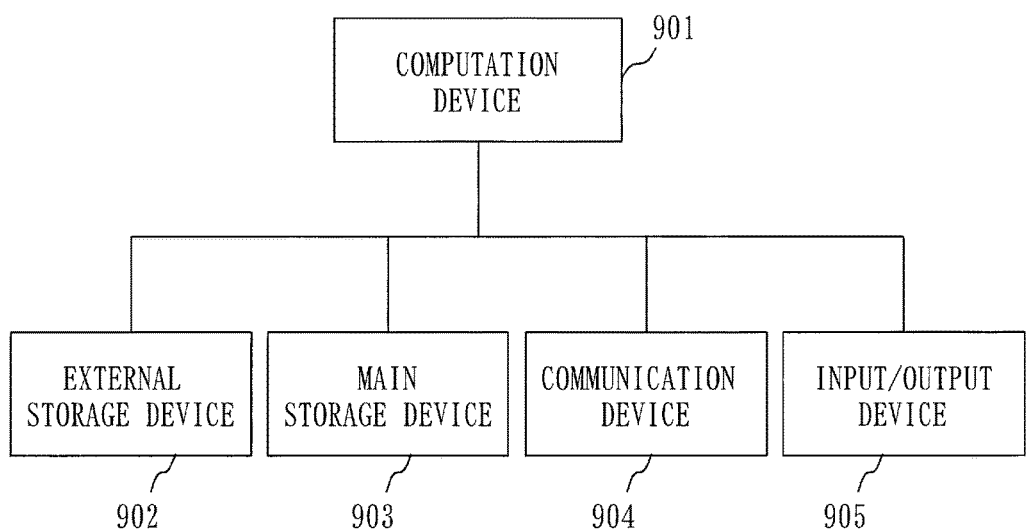
FIG. 6 is a diagram illustrating an example of a hardware configuration of a computer provided to each data center and each factory control system according to Embodiment 1.

FIG. 6 is a diagram illustrating an example of a hardware configuration of a computer provided to each data center and each factory control system according to this embodiment.

A hardware configuration example of each data center and each factory control system will be described with referring to FIG. 6.

The data center and the factory control system each includes a computer. The elements of the data center and factory control system can be implemented by a program.

The hardware configuration of the computer of each data center and each factory control system includes a computation device 901, an external storage device 902, a main storage device 903, a communication device 904, and an input/output device 905 that are connected to a bus.

The computation device 901 is a CPU (Central Processing Unit) which executes the program.

The external storage device 902 is, for example, a ROM (Read Only Memory), a flash memory, or a hard disk unit.

The main storage device 903 is a RAM (Random Access Memory).

The communication device 904 is, for example, a communication board, and is connected to a LAN (Local Area Network) or the like. The communication device 904 is not necessarily connected to a LAN but may be connected to a WAN (Wide Area Network) such as an IP-VPN (Internet Protocol Virtual Private Network), a wide-area LAN, or an ATM (Asynchronous Transfer Mode) network; or the Internet. The LAN, the WAN, and the Internet are examples of a network.

The input/output device 905 is, for example, a mouse, a keyboard, or a display device. A touch panel, a touch pad, a track ball, a pen tablet, or any other pointing device may be used in place of the mouse. The display device may be an LCD (Liquid Crystal Display), a CRT (Cathode Ray Tube), or any other displaying device.

The program is usually stored in the external storage device 902. The program is loaded to the main storage device 903, and sequentially read and executed by the computation device 901.

The program is a program that implements each function described as "unit" illustrated in the block configuration diagram.

A program product (computer program product) is constituted of a storage medium, a storage device, or the like which records the program that implements the function of the "unit" illustrated in the block configuration diagram. A program product refers to a thing loaded with a computer-readable program, irrespective of how it may look.

Furthermore, an operating system (OS) is also stored in the external storage device 902. At least part of the OS is loaded to the main storage device 903. The computation device 901, while executing the OS, executes the program which implements the function of the "unit" illustrated in FIG. 2 and so on.

Application programs are also stored in the external storage device 902. The application programs are loaded to the main storage device 903 and sequentially executed by the computation device 901.

Information such as "table" is also stored in the external storage device 902.

Information, data, signal values, and variable values indicating the results of processes described as "decide", "check", "extract", "detect", "set", "register", "select", "create", "take as input", "output", and so on are stored in the main storage device 903.

The configuration of FIG. 6 is merely an example of the hardware configuration of the computer provided to each data center and each factory control system. The hardware configuration of the computer provided to each data center and each factory control system is not limited to the configuration illustrated in FIG. 6, but may be another configuration.

As described above, the gateway 104 of the management system 800 according to this embodiment transmits a communication switch request, and every profile information of the factory control system 100, including the instrument identifier which identifies the controller and the instrument attribute information which indicates the attribute of the controller, to the data center 201. The data center 201 stores the instrument identifier and the instrument attribute information transmitted from the gateway 104 in correlation to each other, to the instrument information storage unit 2011*a* of the database. In addition, the data center 201 stores every profile information of the factory control system 100 to the database 2011.

For example, when the mobile terminal 300 transmits a management execution request including the attribute of the controller, the data center searches the instrument information storage unit based on the controller attribute included in the management execution request, and acquires an instrument identifier corresponding to the controller attribute included in the management execution request. The data center transmits a session establishing request to the gateway 104, requesting establishment of a session with the controller identified by the acquired instrument identifier.

As has been described above, with the management system 800 according to this embodiment, the connection with the data center (for example, data center 201) is upgraded to WebSocket connection by the gateway 104. Therefore, a management process for the factory control system 100 can also be executed from a mobile terminal 300 located at a remote place.

Embodiment 2

In this embodiment, differences from Embodiment 1 will mainly be described.

In this embodiment, the constituent units that are the same as the constituent units described in Embodiment 1 will be denoted by the same reference numerals, and a description thereof will sometimes be omitted.

Figure 7:
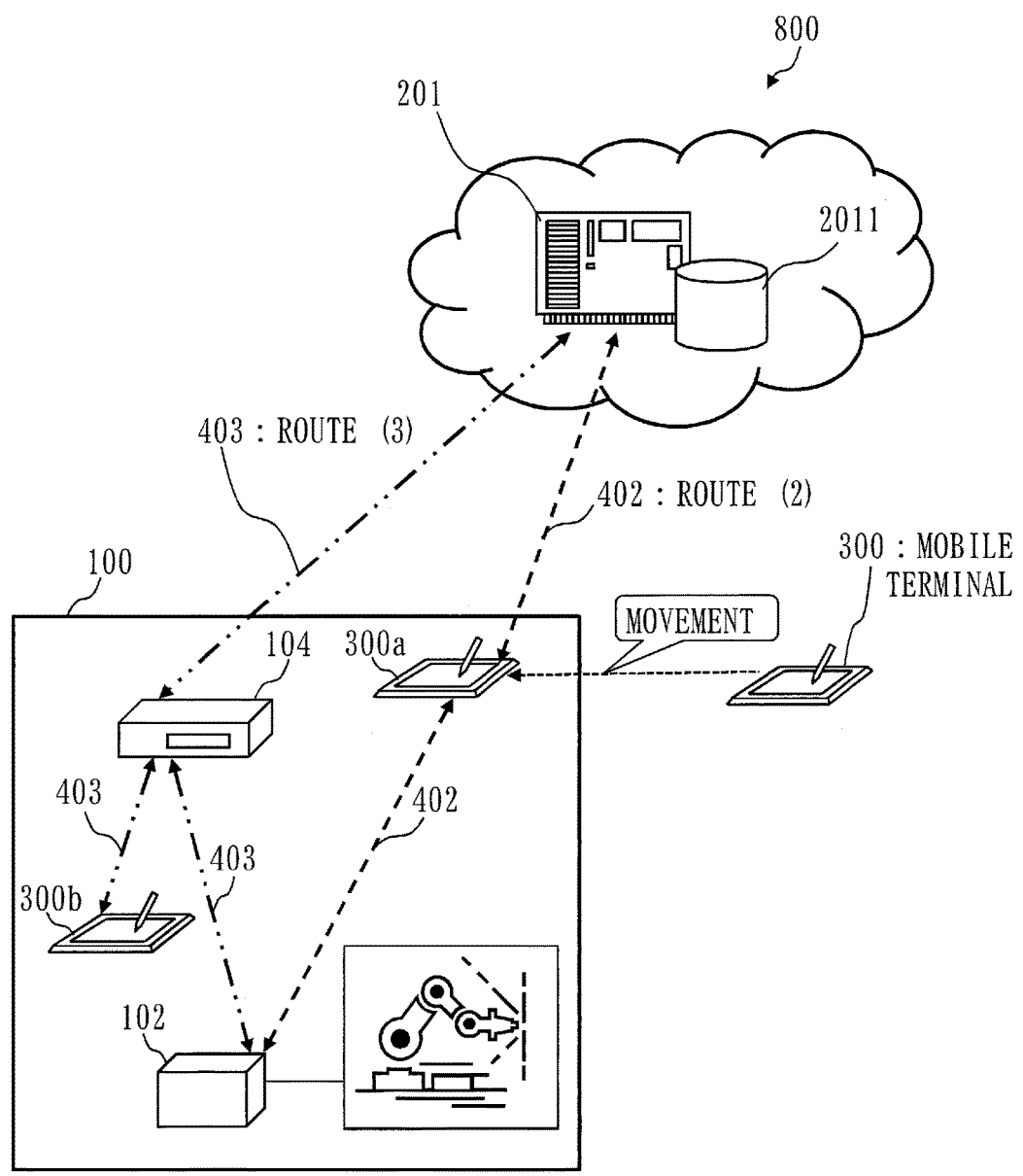
FIG. 7 is a schematic diagram for explaining an example of a function of a management system according to Embodiment 2.

FIG. 7 is a schematic diagram for explaining an example of a function of a management system 800 according to this embodiment.

As described in Embodiment 1, it is common to load a plurality of wireless systems represented by a mobile network, a wireless LAN, Bluetooth (registered trademark), and so on, in a so-called tablet terminal that has become rapidly popular in recent years. This embodiment will describe a case in which a management process of a factory control system 100 is performed with a mobile terminal 300 loaded with a plurality of wireless systems, using a route (2) 402 illustrated in FIG. 7.

First, this management process is premised on that a user carrying the mobile terminal 300 moves from a remote location to a site where the factory control system 100 is built. The mobile terminal 300 that has moved to the site will be referred to as a mobile terminal 300*a*.

When the mobile terminal 300*a* is to be connected to a data center 201, message information "use itself (mobile terminal 300) as a gateway" is added, and a management control operation for the data center 201 is executed. More specifically, the mobile terminal 300*a* transmits a management execution request to which the message information "use itself (mobile terminal 300) as a gateway" has been added, to the data center 201.

The mobile terminal 300*a* secures WebSocket connection for the data center 201 on the mobile network IP connection, in the same manner as the gateway 104 which is set in the factory 103 stationarily.

The mobile terminal 300*a* connects to a PLC 102 based on the route information supplied from the data center 201. Using the wireless LAN, the mobile terminal 300*a* connects to the PLC 102 via an access point which is set in a factory 103. Note that the route information supplied from the data center 201 has been prepared for each access point separately. Hence, the route to the PLC 102 is replaced by route information from the access point to which the mobile terminal 300*a* is connected.

So far the management method for the management system 800 using the route (2) 402 in FIG. 7 has been described.

A management method of the management system 800 that uses a route (3) 403 in FIG. 7 will now be described.

The mobile terminal 300 can access the data center 201 via the wireless LAN and a gateway 104. The mobile terminal 300 which accesses the data center 201 via the wireless LAN and the gateway 104 will be referred to as a mobile terminal 300b.

The mobile terminal 300 transmits a management execution request to the data center 201 via the wireless LAN and the gateway 104. After that, as has been described in Embodiment 1, the gateway 104 establishes a session between the data center 201 and the PLC 102, and the data center 201 executes the management process via the gateway 104. In this case as well, the route beyond the connected wireless LAN access point is referred to.

As described above, when the mobile terminal 300 is connected to the gateway without intervening a public network, the management information (profile information such as position attribute information and instrument attribute information) of the controller managed by the database is treated as in-area information of the controller being the target of the management execution process.

A commercially available wireless LAN access point and the wireless LAN adapter of a commercially available tablet terminal have outputs that are excessively large for the radio-wave propagation environment of the factory. To apply to this embodiment, an output of approximately 5 dbm is appropriate.

As described above, in the management system 800 according to this embodiment, when the mobile terminal 300a moves into the factory 103, the mobile terminal 300a can function as the gateway, and the mobile terminal 300a can execute the management control process of the factory control system 100. When the mobile terminal 300b moves into the factory 103, the mobile terminal 300b can access the data center 201 via the wireless LAN and the gateway 104.

Embodiment 3

In this embodiment, the route information 500 of the route to the PLC 102 described in Embodiments 1 and 2 will be described in detail.

Figure 8:
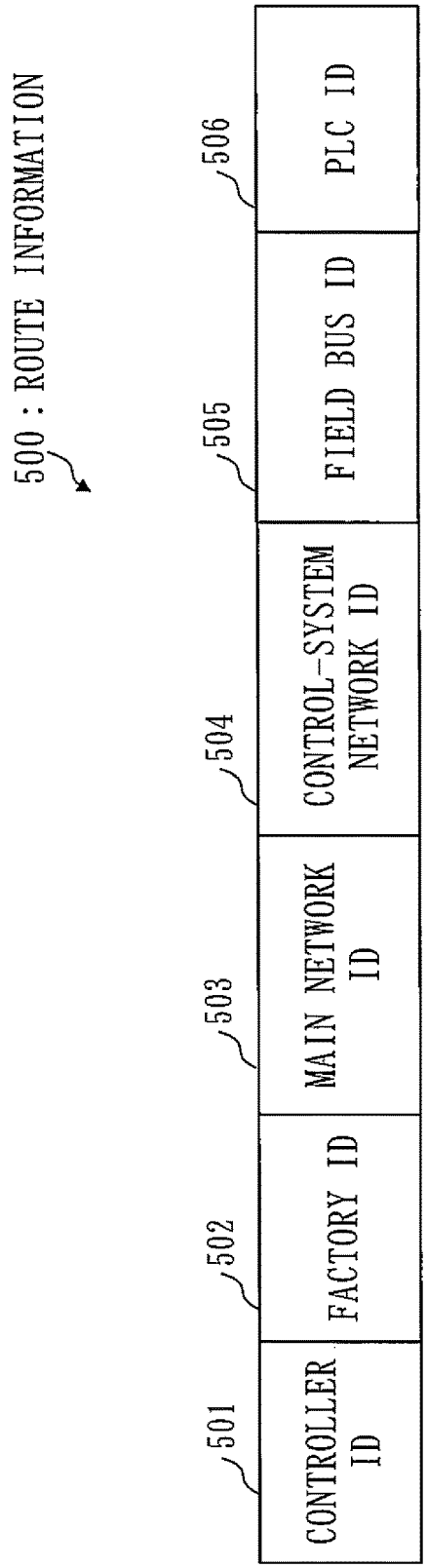
FIG. 8 is an example of a data structure (table schema) of route information 500 stored in a database of a data center according to Embodiment 3.

FIG. 8 is an example of a data structure (table schema) of route information 500 stored in a database 2011 of a data center 201 according to this embodiment.

Figure 9:
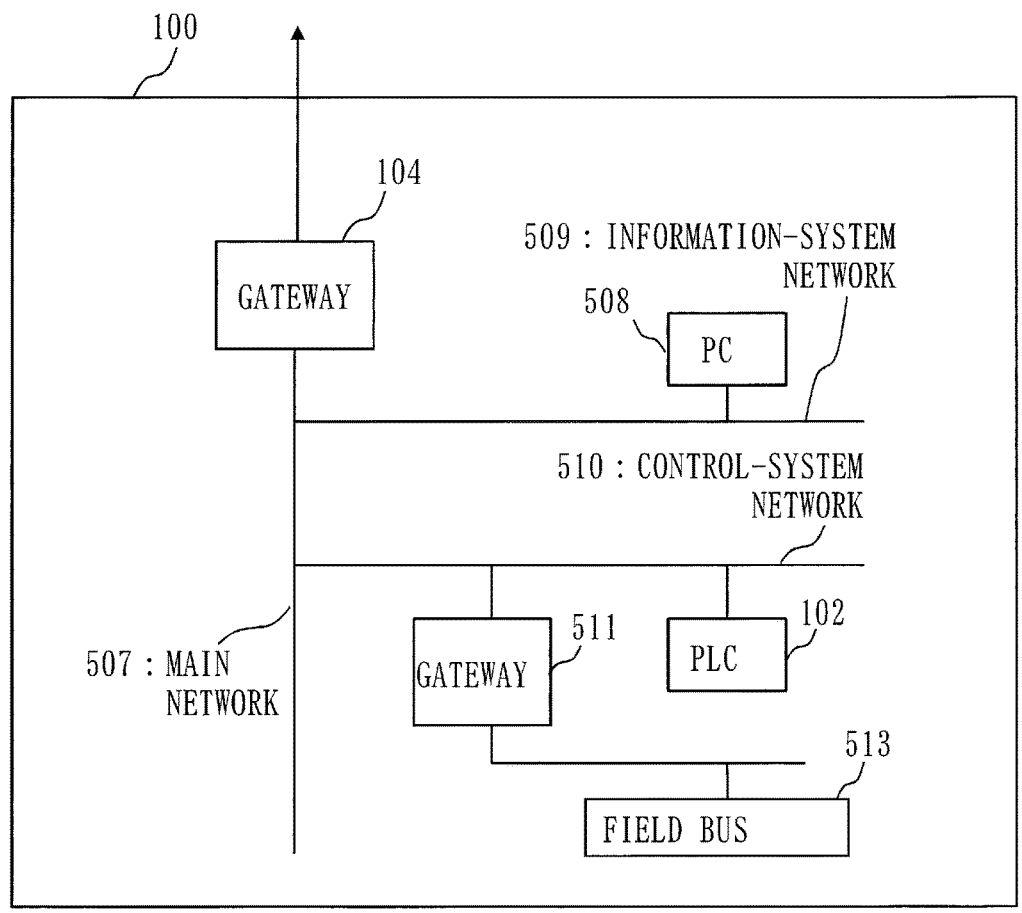
FIG. 9 is a diagram illustrating an example of a network layout of a factory control system according to Embodiment 3.

FIG. 9 is a diagram illustrating an example of a network layout of a factory control system 100 according to this embodiment.

Referring to FIG. 8, the route information 500 has an controller ID 501, a factory ID 502, a main network ID 503, a control-system network ID 504, a field bus ID 505, and a PLC ID 506. The controller ID 501, the factory ID 502, the main network ID 503, the control-system network ID 504, the field bus ID 505, and the PLC ID 506 are examples of the table schema of the route information 500 stored in the database of the data center.

The controller ID 501 is the unique identifier given to all the controllers which are programmable and managed by the data center. For example, an UUID (Universally Unique Identifier) (an ID that will not possibly overlap if no particular control mechanism is provided) such as "550e8400-e29b-41d4-a716-446655440000" is assigned to part of the controller ID 501. The controller ID 501 can be utilized as an index to another database or another table when further management information is necessary.

The factory ID 502 is the unique identifier of the factory 103. The factory ID 502 is linked to the gateway 104 stationarily set in the factory 103. A connection information database for connection between the gateway 104 and the data center is managed by the factory ID 502. The factory ID 502 is inked to a database and a table that manage more detailed attribute information such as the address, telephone number, and so on of the factory 103.

The main network ID 503 is the identifier of a main network 507 built in the factory 103, as illustrated in FIG. 9. The gateway 104, an information-system network 509, and a control-system network 510 are connected to the main network 507. The requirement for the network layout in the factory 103 differs from one factory 103 to another and varies largely. The network layout example illustrated in FIG. 9 is merely an example of a very simple layout.

The control-system network ID 504 is the identifier of the control-system network 510. The control-system network 510 is linked to a database and a table that manage the attribute information of the control-system network 510, based on the control-system network ID 504. The attribute information of the control-system network 510 includes, for example, a media type such as Ethernet (registered trademark), procedure information of an ISO network model applied, for example, whether the ISO network model is two-layered, three-layered, or five-layered, and detailed connection information. A gateway 511 to connect to the PLC 102 and the field bus 513 is connected to the control-system network 510.

The information-system network 509 is an IP network, and a PC 508 is connected to the information-system network 509. Both the information-system network 509 and the PC 508 have identifiers, as the control-system network ID 504 and so on do, and can store additional attribute information to the database on the data center. As the information-system network 509 is an IP network, the gateway 104 may also serve as a VPN (Virtual Private Network) router, or may be connected to a VPN router. In the latter case, DNS (Domain Name Service) registration may be performed in an overlapping manner. As long as the network built in the factory is an IP network, the information-system network 509 can be connected as the IP network to any place.

The field bus ID 505 is the identifier of a field bus 513. A field bus is a standard that exchanges signals between a controller and an on-site instrument (measurement unit, manipulator) operating in a factory or the like, by using digital communication. The field bus 513 is linked to a database and a table that manage the attribute information of the field bus ID 505, based on the field bus ID 505. The attribute information of the field bus ID 505 includes, for example, a media type such as RS485, procedure information of an ISO network model applied, for example, whether the ISO network model is two-layered, three-layered, or five-layered, and detailed connection information.

The PLC ID 506 is the identifier of the PLC 102 being the destination of this route. The PLC ID 506 can store the attribute information such as the type, function, and role, of the PLC 102 to the database on the data center, based on the PLC ID 506.

As described above, in the management system 800 according to this embodiment, the data center transmits the route information 500 of the route to a programmable controller (for example, the PLC 102), to the gateway 104. In the data center, the instrument attribute information, factory attribute information, and the like stored in the database are correlated to each other.

Hence, only by including various types of information such as "bottling nozzle at address:" into the management execution request from the mobile terminal 300, a desired controller can be specified at the data center.

More specifically, if information "bottling nozzle at address:" is included in the management execution request, the management control unit 2013 acquires the controller ID 501, factory ID 502, main network ID 503, control-system network ID 504, field bus ID 505, and PLC ID 506 from the profile information such as the factory attribute information, the instrument attribute information, and so on of the database, based on "address:" and "bottling nozzle".

In this manner, a management control unit 2013 of the data center can easily access a controller which controls a nozzle, and a control program of the controller, thus enabling management of the controller, for example, the management process such as changing the filling amount, of the controller.

As has been described above, with the route information 500 of the management system 800 according to this embodiment, a unique identifier is given to each of all programmable controllers that constitute the factory control system, and this identifier and the profile information including the geographical information of the controller and the communication route information can be managed in correlation to each other.

Embodiment 4

In this embodiment, differences from Embodiments 1 to 3 will mainly be described.

The constituent units that are the same as the constituent units described in Embodiments 1 to 3 will be denoted by the same reference numerals, and a description thereof will sometimes be omitted.

According to a method of specifying a desired controller, the controller can be specified in a reverse direction from the attributes of various types of controllers, as described in Embodiment 3.

According to this embodiment, the data center manages the position information of a mobile terminal 300 that has transmitted a management execution request.

The data center can obtain the position of the controller being the target of the management execution request transmitted by the mobile terminal 300, from the in-area information obtained by wireless LAN connection, of the mobile terminal 300. For example, the data center searches the database based on the in-area information obtained by wireless LAN connection, of the mobile terminal 300, specifies the factory 103 where the mobile terminal 300 is present, and specifies the controller located in the specified factory 103.

The data center can also obtain the position of the controller being the target of the management execution request transmitted by the mobile terminal 300, from the in-area information of the mobile terminal 300. The in-area information of the mobile terminal 300 can be obtained from the in-area information possessed by a mobile virtual network operator. For example, the data center may specify the factory 103 the nearest to the mobile terminal 300 based on the in-area information possessed by the mobile virtual network operator, of the mobile terminal 300. Then, the data center specifies a controller located in the specified factory 103.

As described above, when the mobile terminal 300 connects to the data center vi a mobile virtual network operator, the in-area information possessed by the mobile virtual network operator is treated as the in-area information of the mobile terminal 300 (in-area information on the controller being the target of the management execution process).

As described above, in the management system 800 according to this embodiment, the in-area information possessed by the mobile virtual network operator, or the in-area information obtained by wireless LAN connection, can be treated as a parameter for reverse specifying. Therefore, only by including information such as "bottling nozzle" into the management execution request transmitted from the mobile terminal 300, a desired controller can be specified by the data center.

Embodiment 5

In this embodiment, differences from Embodiment 4 will mainly be described.

The constituent units that are the same as the constituent units described in Embodiment 4 will be denoted by the same reference numerals, and a detailed description thereof will sometimes be omitted.

With a management system 800 according to this embodiment, a controller can be specified more visually in a mobile terminal 300. For example, facility layout information in a factory 103 is visualized in the mobile terminal 300 by using a map display application.

The user zooms in to a desired controller from a large-area map, and clicks the controller on the map displayed on the screen. Then, the mobile terminal 300 starts up a control information screen (for example, a SCADA (Supervisory Control And Data Acquisition) screen) indicating the operation status of the controller. The user sets up an edit screen of the control program of the controller with another click operation. After editing, the user hits a program update button, thereby executing a management process of updating the control program.

The map display application is, for example, an application such as a geographic database service provided by Google, Inc.

As described above, with the management system 800 according to this embodiment, the controller can be specified more visually in the mobile terminal 300. Therefore, a management system having high usability can be provided.

Embodiment 6

In this embodiment, differences from Embodiments 1 to 5 will mainly be described.

The constituent units that are the same as the constituent units described in Embodiments 1 to 5 will be denoted by the same reference numerals, and a detailed description thereof will sometimes be omitted.

Figure 10:
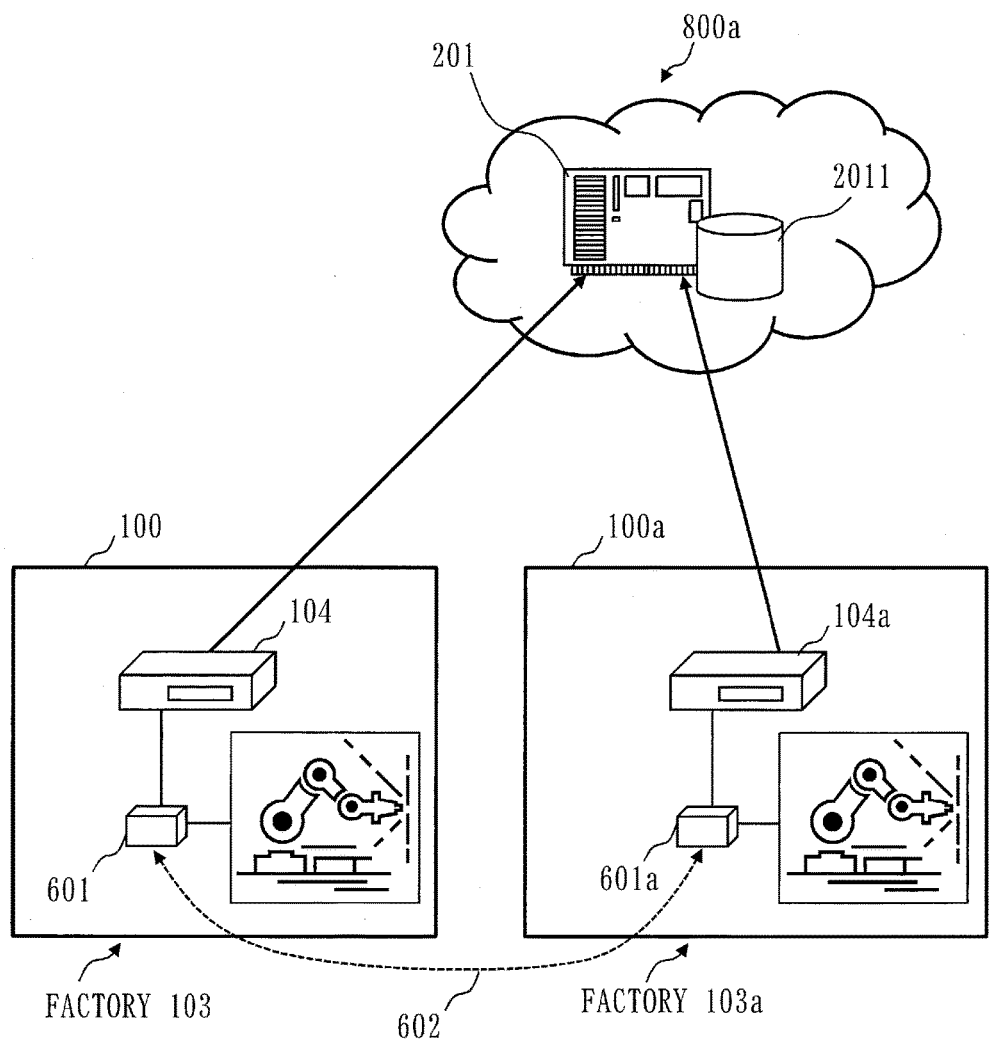
FIG. 10 is a schematic diagram for explaining an example of a function of a management system according to Embodiment 6.

FIG. 10 is a schematic diagram for explaining an example of a function of a management system 800a according to this embodiment.

There is no restriction for using the management system described in Embodiments 1 to 5, by a controller itself in the same manner as an operation terminal is used. How two or more factories 103 geographically remote from each other cooperate with each other by using a management system 800a according to this embodiment will be described with referring to FIG. 10. Then, it becomes easy to manufacture products of the same type at two or more factories 103.

The management system 800a according to this embodiment includes two factory control systems that are a factory control system 100 and a factory control system 100a which are connected to a data center 201. The factory control system 100 includes a controller 601. The factory control system 100a includes a controller 601a.

The factory 103 where the factory control system 100 is built and a factory 103a where the factory control system 100a is built fabricate one product by cooperation. The factory control system 100 is in charge of the first-half stage. The factory control system 100a is in charge of the second-half stage.

The factory 103a is in charge of product assembly. The controller 601a of the factory 103a has production recipe data of the product and performs a control system management concerning fine parameter adjustment, about the controller 601.

The outline of the process in the management system 800a according to this embodiment will be described.
(1) The controller 601a transmits a management execution request targeted at the controller 601, to the data center 201 via a wireless LAN and a gateway 104a of the factory control system 100a.
(2) The data center 201 acquires route information 500 of a route to the controller 601 based on the management execution request, and transmits a session establishing request to a gateway 104.
(3) When a session between the data center 201 and the controller 601 is established, the data center 201 executes a management process requested by the controller 601a, through this session.

As described above, with the management system 800a according to this embodiment, the controller 601a can be operated as a mobile terminal 300. Therefore, the controller 601 and the controller 601a operate as if they shared a field bus 602 between them.

Embodiment 7

In this embodiment, differences from Embodiments 1 to 6 will mainly be described.

The constituent units that are the same as the constituent units described in Embodiments 1 to 6 will be denoted by the same reference numerals, and a detailed description thereof will sometimes be omitted.

Figure 11:
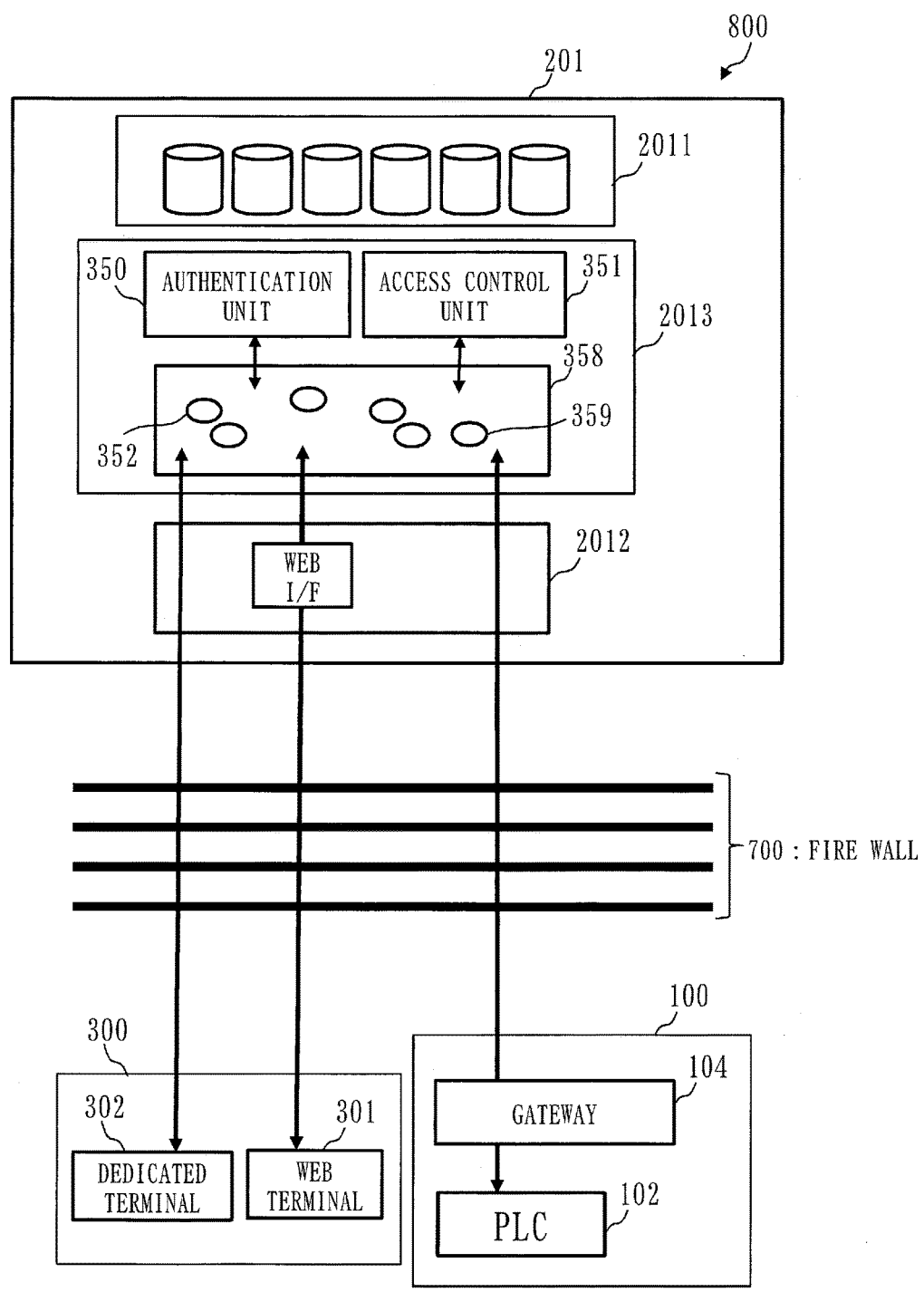
FIG. 11 is a detailed block configuration diagram illustrating an example of a detailed function block of a management system according to Embodiment 7.

FIG. 11 is a detailed block configuration diagram illustrating an example of a detailed function block of a management system 800 according to Embodiment 7.

As illustrated in FIG. 11, a gateway 104, a data center 201, and a mobile terminal 300 are protected by a multiple fire wall 700. Note that as the mobile terminal 300, a WEB terminal 301 and a dedicated terminal 302 are connected to the data center.

A management control unit 2013 includes an authentication unit 350, an access control unit 351, and a program storage unit 358. The program storage unit 358 stores a plurality of programs including a program 352 and a program 359. The authentication unit 350 may be a single authentication server. The management control unit 2013 may include a program registration unit (not illustrated) which registers a program to the program storage unit 358. The program registration unit accepts a registration request for a new program from the user and stores the new program to the program storage unit 358 based on the registration request.

The program storage unit 358 stores the plurality of programs which execute processes that are different from each other. The various types of programs stored in the program storage unit 358 are sometimes called service agents which execute various types of services.

Practical examples of the services provided by the various types of service agents (programs) stored in the program storage unit 358 will be described later.

Using the mobile terminal 300, the user requests services that are provided when the various types of service agents are executed, from the data center as a management execution request.

When the data center receives the management execution request, the authentication unit 350 executes an authentication process. When the authentication unit 350 completes authentication about execution of a service agent requested by the management execution request, the service agent that has completed authentication is upgraded, and an execution context (execution context part) is created. When the service agent is upgraded and an execution context (execution context part) is created, this state is also described that the service agent is launched.

The created execution context establishes a session for accessing: other programs which are stored in the data base and the program storage unit 358; the factory control system 100; and so on, if it is necessary for the execution.

As described above, with the management system 800 according to this embodiment, a desired service agent can be activated in the data center from the mobile terminal 300. Also, execution of the service agent can be continued even when the mobile terminal 300 is in a disconnected state from the data center, that is, even after the mobile terminal 300 is disconnected from the data center. If necessary, the service agent can call: the gateway 104 which constitutes the service; controllers subordinate to the gateway 104; and a mobile terminal 300 that has issued the request for service.

A communication control unit 2012 of the data center 201 executes session control for each of the gateway 104 and the mobile terminal 300.

The authentication unit 350 executes an authentication process of when the mobile terminal 300 is to connect to the data center 201. When the mobile terminal 300 is authenticated by the authentication unit 350, the access control unit 351 checks the management execution request transmitted from the mobile terminal 300.

The management control unit 2013 accesses the large number of programs and the database prepared in the program storage unit 358, based on the management execution request transmitted from the mobile terminal 300. The access control unit 351 checks whether or not this access matches the authority level of the mobile terminal 300. If the access control unit 351 decides that the mobile terminal 300 has the access authority, the communication control unit 2012 constitutes a session (a session based on the management execution request) desired by the user of the mobile terminal 300.

The management system 800 according to this embodiment can provide a permanent service or a temporary service, in addition to the service in which the management control unit 2013 and the communication control unit 2012 constitute a session and operate in synchronism with each other, as described above.

An example of the permanent service provided includes monitoring of the production facility.

The mobile terminal 300 starts up the program 352 implemented with a monitoring logic. If the mobile terminal 300 has the access authority to start up the program 352, the program 352 is set in an execution state. If a problem occurs in the production facility, an alert is produced toward a concerned system and operator by the monitoring process of the program 352.

An example of the temporary service includes monitoring execution of a production plan. The mobile terminal 300 starts up the program 359 implemented with a logic that monitors and executes the production plan. If the mobile terminal 300 has the access authority to start up the program 359, the program 359 is started. For example, a report on the actual production state is created by the monitoring execution process of the production plan of the program 359. The created report is outputted to, for example, the mobile terminal 300.

Other than the services described above, the following services can be raised as practical examples.

(1) Providing MES (Manufacturing Execution System)

MES is a system linked to the sections of a factory production line, to monitor and manage the operations of the machines and workers of the factory. MES is also associated with the working procedure, receipt of goods, delivery, quality control, maintenance, scheduling, and so on, to perform monitoring and management. Monitoring and management by MES can be executed by setting up MES of the data center from the mobile terminal 300.

(2) Inventory Management Service

When the inventory management service is requested by the mobile terminal 300, a report on the stock status and so on is outputted.

(3) Parts Procurement Service

When the parts procurement service is requested by the mobile terminal 300, a report on the parts supplier, procurement lead time, and so on is outputted.

(4) Providing Control Program Development Environment, Editing Control Program

The control program development environment differs depending on a PLC 102 which is to edit the control program. In such a case as well, a desired development environment can be selected out of a plurality of development environments, and operations such as creation, alteration, update, and so on of the control program can be performed by the mobile terminal 300.

(5) Providing SCADA described in Embodiment 5

(6) Logistics Management Service, Delivery Means Management Service

When the logistics management service is requested by the mobile terminal 300, a report on the logistics status is outputted. When the delivery means management service is requested by the mobile terminal 300, a report on status of trucks, freight trains, cargo planes, and the like being a delivery means is outputted.

(7) Recipe Data Management Service

When the recipe data management service is requested by the mobile terminal 300, the recipe data of a desired factory can be checked with the mobile terminal 300.

Embodiment 8

According to this embodiment, differences from Embodiments 1 to 7 will mainly be described.

The constituent units that are the same as the constituent units described in Embodiments 1 to 7 will be denoted by the same reference numerals, and a detailed description thereof will sometimes be omitted.

Cloud services involve various modes. With an application that performs synchronous execution often, if a device that executes the application and a data center connected to this device are geographically separated apart by a long distance, a communication delay due to the distance is included in the execution time of the application for each remote execution. To obtain a comfortable response performance, the data center is desirably as near as possible.

This poses a serious issue for a globally developing corporation. It may be too costly for a single cooperation to develop a data center. If a public cloud that has already been developed globally is available, the corporation can provide a service quickly at a low cost.

When a management system 800 is to be built by utilizing the public cloud already developed globally, the security must be ensured in the management system 800.

The management system 800 according to this embodiment provides a robust security mechanism in behalf of public cloud use, as will be described below.

In the management system 800, every piece of data is encrypted by a functional encryption.

When a session that has been authenticated is to be established, an authentication unit 350 generates a re-encryption key which encrypts data necessary for constituting the session, and distributes the generated re-encryption key to all the constituent elements (configuration program) (execution context part) constituting the session. Hence, the data necessary for constituting the session is encrypted by functional encryption using the re-encryption key.

All communications in the management system 800 are entirely encrypted including IPC (Inter Process Communication), and a common encryption key is updated periodically (for example, every 30 minutes). The authentication unit 350 sends a new common encryption key for each session periodically to session management (communication control unit 2012).

Due to the above security mechanism, a robust data secrecy can be maintained at the data center by performing re-encryption only once when establishing the session.

If any component has failed in updating the common encryption key, communication is no longer possible, and accordingly a session must be regenerated. Then, the possibilities of an unauthorized access to the service and an unauthorized message being sent from the service are eliminated.

In this manner, when an authentication process is completed and a session is established, a service (program) executed on a gateway 104, a mobile terminal 300, and the data center acquires a common encryption key linked to a session identifier that identifies the established session, from the authentication unit 350 (authentication server), and updates the common encryption key, periodically in accordance with a prescribed procedure. Hence, the management system 800 according to the present invention can provide a robust security mechanism in behalf of public cloud use.

Embodiment 9

In this embodiment, differences from Embodiments 1 to 8 will mainly be described.

The constituent units that are the same as the constituent units described in Embodiments 1 to 8 will be denoted by the same reference numerals, and a detailed description thereof will sometimes be omitted.

A management system 800 according to this embodiment further provides system robustness in data duplication. As a common cloud operating scheme, a method that employs a virtual machine is widely operated. According to this method employing the virtual machine, an emulator of a computer is implemented by an application program, and the operating system operates on the emulation program.

Since the operation uses the virtual machine, when the CPU burden of the virtual machine is high, a CPU resource is allocated; when the memory resource is insufficient, the memory resource is allocated dynamically. An inverse degeneration is also possible.

Figure 12:
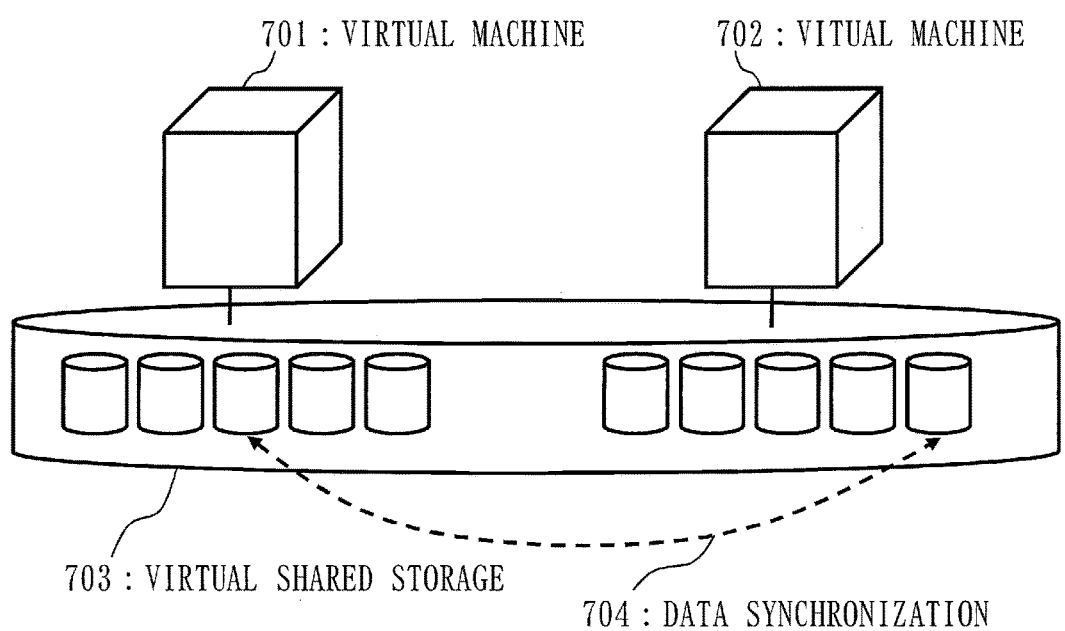
FIG. 12 is a schematic diagram for explaining the outline of a management system according to Embodiment 9.

FIG. 12 is a schematic diagram for explaining the configuration of the management system 800 according to this embodiment.

The management system 800 according to this embodiment includes a plurality of machines 701 and 702 which constitute a multiple system. The virtual machines 701 and 702 share a virtual shared storage 703. The virtual shared storage 703 is an emulation device of a virtual machine.

FIG. 12 illustrates a mode in which the virtual machines 701 and 702 geographically separated apart use the single virtual shared storage 703. The virtual machines 701 and 702 are mutually duplicating virtual machines operated on different data centers.

The virtual shared storage 703 appears as an ordinary storage on each of the virtual machines 701 and 702. The virtual shared storage 703 performs data synchronization 704 successively in response to a storage update request outputted from the virtual machine 701 or virtual machine 702, so that the data of the storages constituting the virtual shared storage 703 is always the latest.

More specifically, the virtual shared storage 703 includes a plurality of physical data storages. Each of the virtual machines 701 and 702 synchronizes the plurality of physical data storages.

The number of virtual machines which use the virtual shared storage 703 is not particularly limited.

As described above, in the management system 800 according to this embodiment, all the programs on the data centers are executed on the virtual machines. The virtual machines on the data centers share the virtual shared storage with each other. The virtual shared storage is constituted of the physical data storages. A duplicate virtual machine of each data center constantly maintains a duplication state due to successive data synchronization among the physical data storages.

The configuration of the function block of the data center and of the factory control system 100 is not limited to the bock configurations in Embodiments 1 to 9 described above. The block configurations described above in Embodiments 1 to 9 are arbitrary. A block configuration other than the block configurations described above in Embodiments 1 to 9 may also be employed.

For example, in FIG. 2, the data center 201 includes the communication control unit 2012 and the management control unit 2013. However, the data center 201 is not limited to this configuration. The communication control unit 2012 and the management control unit 2013 may form one function block. Alternatively, the request transmission unit 1041 and session securing unit 1042 of the gateway 104 may form one function block.

Various changes can be made to the function block as needed as far as they are not contradictory, and the above block configuration is an arbitrary. Namely, the function blocks described in Embodiments 1 to 9 may be arranged distributedly in any manner in the parts management system as far as they are not contradictory.

The embodiments of the present invention have been described. Of the above embodiments, two or more embodiments may be practiced by combination. Alternatively, of the above embodiments, one embodiment may be practiced partially. Alternatively, of the above embodiments, two or more embodiments may be practiced by partial combination.

The above embodiments are essentially preferable exemplifications and are not intended to limit the scope of the present invention, the scope of the applied product of the present invention, and the scope of usage of the present invention. Various changes can be made to the above embodiments as needed as far as they are not contradictory.

REFERENCE SIGNS LIST

100: factory control system; 102: PLC; 103: factory; 104: gateway; 200: cloud-side system; 201: data center; 202: data center; 300, 300a, 300b: mobile terminal; 301: WEB terminal; 302: dedicated terminal; 350: authentication unit; 351: access control unit; 352: program; 358: program storage unit; 359: program; 401: route (1); 402: route (2); 403: route (3); 500: route information; 501: controller ID; 502: factory ID; 503: main network ID; 504: control-system network ID; 505: field bus ID; 506: PLC ID; 507: main network; 508: PC; 509: information-system network; 510: control-system network; 511: gateway; 513: field bus; 601: controller; 602: field bus; 701, 702: virtual machine; 703: virtual shared storage; 704: data synchronization; 800: management system; 901: computation device; 902: external storage device; 903: main storage device; 904: communication device; 905: input/output device; 1041: request transmission unit; 1042: session securing unit; 2011: database; 2011a: instrument information storage unit; 2012: communication control unit; 2013: management control unit; 2021: database

The invention claimed is:

1. A management system comprising:
a gateway device connected to a controller;
a server device configured to
receive a management execution request requesting execution of a management process for managing the controller,
generate, based on the received management execution request, designation information designating the controller, and
transmit a session establishing request with the designation information being included therein, requesting establishment of a session with the controller, to the gateway device; and
a terminal device to communicate with the server device, the terminal device transmitting the management execution request to the server device,
wherein the gateway device transmits a communication switch request by a first communication scheme, the communication switch request serving to switch connection with the server device, from the first communication scheme of transmitting a request to the server device unidirectionally to a second communication scheme of transmitting/receiving a request to/from the server device mutually,
wherein the server device, when the communication switch request is received from the gateway device, switches communication with the gateway device to the second communication scheme, and transmits the session establishing request to the gateway device by the second communication scheme,
wherein the server device further includes a program storage unit to store a plurality of programs which execute different processes individually, and
wherein the terminal device transmits a request requesting execution of the management process, as the management execution request, the management process using at least one of the plurality of programs stored in the program storage unit.

2. The management system according to claim 1, wherein the gateway device, when the session establishing request is received from the server device, establishes a session in which the server device and the controller communicate with each other by the second communication scheme, and wherein the server device executes the management process against the controller through the session established by the gateway device.

3. The management system according to claim 1, wherein an execution context part is created in the program storage unit, the execution context part executing at least one of the plurality of programs based on the management execution request transmitted from the terminal device.

4. The management system according to claim 3, wherein the execution context part establishes a session necessary for executing at least one of the plurality of programs.

5. The management system according to claim 4, wherein the server device further includes an authentication unit to generate, when the session is established, a re-encryption key for encrypting data to be accessed in the established session, by a functional encryption, and to distribute the generated re-encryption key to the execution context part.

6. The management system according to claim 1, wherein the server device further includes a program registration unit to register a program with the program storage unit.

7. The management system according to claim 1,
wherein the gateway device transmits the communication switch request to the server device, and transmits an instrument identifier identifying the controller, and instrument attribute information indicating an attribute of the controller, to the server device,
wherein the server device includes an instrument information storage unit to store the instrument identifier and the instrument attribute information in correlation to each other, the instrument identifier and the instrument attribute information being transmitted from the gateway device,
wherein the terminal device transmits the management execution request including an attribute of the controller, to the server device, and
wherein the server device searches the instrument information storage unit based on the attribute included in the management execution request, of the controller, acquires the instrument identifier corresponding to the attribute included in the management execution request, of the controller, and transmits the session establishing request requesting establishment of a session with the controller identified by the instrument identifier, by treating the acquired instrument identifier as the designation information, to the gateway device.

8. The management system according to claim 7,
wherein the gateway device transmits the communication switch request to the server device, and further transmits the instrument identifier and instrument position information which indicates a position of the controller, to the server device,
wherein the instrument information storage unit further stores the instrument identifier and the instrument position information in correlation to each other,
wherein the terminal device transmits the management execution request including information indicating the position of the controller, to the server device, and
wherein the server device searches the instrument information storage unit based on the attribute included in the management execution request, of the controller, and on the information indicating the position of the controller, and acquires the instrument identifier corresponding to the attribute of the controller and to the information indicating the position of the controller.

9. The management system according to claim 1, wherein the gateway device accepts an execution permission request permitting execution of the management process by the server device, and when the execution permission request is accepted, transmits the communication switch request.

10. The management system according to claim 4,
wherein the first communication scheme is hypertext transfer protocol communication, and
wherein the second communication scheme is WebSocket communication.

11. The management system according to claim 1,
wherein the server device includes a plurality of server devices constituting a multiple system, and
wherein the gateway device transmits the communication switch request to a nearest server device among the plurality of server devices.

12. The management system according to claim 1,
wherein the server device includes a plurality of virtual machines constituting a multiple system,
the plurality of virtual machines sharing a virtual shared storage,
the virtual shared storage including a plurality of physical data storages, and
wherein each of the plurality of virtual machines synchronizes the plurality of physical data storages.

13. A management system comprising:
a terminal device configured to
transmit a gateway function execution request and a communication switch request by a first communication scheme, the gateway function execution request serving to execute a function of a gateway device which is connected to a server device and connected to a controller, the gateway device being connected to the server device by the first communication scheme of transmitting a request to the server device unidirectionally,
mediate communication between the server device and the controller, the communication switch request serving to switch connection with the server device from the first communication scheme to a second communication scheme of transmitting/receiving a request to/from the server device mutually,
wherein the server device, when the gateway function execution request and the communication switch request are received from the terminal device, switches communication with the terminal device to the second communication scheme,
wherein the terminal device transmits a management execution request requesting execution of a management process of managing the controller, to the server device,
wherein the server device receives the management execution request from the terminal device, and transmits a session establishing request to the gateway device by the second communication scheme, the session establishing request requesting establishment of a session with the controller based on the received management execution request,
wherein the server device includes a program storage unit to store a plurality of programs which execute different processes individually, and
wherein the terminal device transmits a request requesting execution of the management process, as the management execution request, the management process using at least one of the plurality of programs stored in the program storage unit.

14. A gateway device comprising:
a controller connecting unit to be connected to a controller;
a request transmission unit, connected to a server device, to transmit a communication switch request by a first communication scheme, the communication switch request serving to switch connection with the server device, from the first communication scheme of transmitting a request unidirectionally to a second communication scheme of transmitting/receiving a request to/from the server device mutually; and
a session securing unit which, when a session establishing request is transmitted by the second communication scheme from the server device that has received a management execution request requesting execution of a management process against the controller, from a terminal device, the session establishing request requesting establishment of a session with the controller based on the management execution request, establishes a session in which the server device and the controller communicate with each other by the second communication scheme,
wherein the server device includes a program storage unit to store a plurality of programs which execute different processes individually, and
wherein the terminal device transmits a request requesting execution of the management process, as the management execution request, the management process using at least one of the plurality of programs stored in the program storage unit.

15. A server device comprising:
a program storage unit to store a plurality of programs which execute different processes individually,
a communication control unit which, when a communication switch request is transmitted by a first communication scheme from a gateway device connected by the first communication scheme of transmitting a request unidirectionally, the communication switch request serving to switch connection with the gateway device, from the first connection scheme to a second communication scheme of transmitting/receiving a request to/from the gateway device mutually, switches communication with the gateway device to the second communication scheme, and
a management control unit which, when a management execution request requesting execution of a management process of managing a controller connected to the gateway device, is received from a terminal device, transmits a session establishing request to the gateway device by the second communication scheme, the session establishing request requesting establishment of a session with the controller based on the received management execution request, and executes the management process against the controller through the session established by the gateway device,
wherein the terminal device transmits a request requesting execution of the management process, as the management execution request, the management process using at least one of the plurality of programs stored in the program storage unit.

16. A management method comprising:
by a gateway device connected to a server device and connected to a controller, transmitting a communication switch request by a first communication scheme, the communication switch request serving to switch connection with the server device, from the first communication scheme of transmitting a request unidirectionally to a second communication scheme of transmitting/receiving a request to/from the server device mutually;
by the server device, when the communication switch request is received from the gateway device, switching communication with the gateway device to the second communication scheme;
by a terminal device, transmitting a management execution request requesting execution of a management process of managing the controller, to the server device; and
by the server device, receiving the management execution request from the terminal device, and transmitting a session establishing request requesting establishment of a session with the controller based on the received management execution request, to the gateway device by the second communication scheme,
wherein the server device includes a program storage unit to store a plurality of programs which execute different processes individually, and
wherein the terminal device transmits a request requesting execution of the management process, as the management execution request, the management process using at least one of the plurality of programs stored in the program storage unit.

17. A gateway method comprising:
by a request transmission unit of a gateway device connected to a server device and connected to a controller, transmitting a communication switch request by a first communication scheme, the communication switch request serving to switch connection with the server device, from the first communication scheme of transmitting a request unidirectionally to a second communication scheme of transmitting/receiving a request to/from the server device mutually; and
when a session establishing request is transmitted by the second communication scheme from the server device that has received, from a terminal device, a management execution request requesting execution of a management process against the controller, the session establishing request requesting establishment of a session with the controller based on the management execution request; by a session securing unit of the gateway device, establishing a session in which the server device and the controller communicate with each other by the second communication scheme,
wherein the server device includes a program storage unit to store a plurality of programs which execute different processes individually, and
wherein the terminal device transmits a request requesting execution of the management process, as the management execution request, the management process using at least one of the plurality of programs stored in the program storage unit.

18. A management process execution method comprising:
when a communication switch request is transmitted from a gateway device by a first communication scheme, the gateway device being connected by the first communication scheme of transmitting a request unidirectionally, the communication switch request serving to switch connection with the gateway device, from the first scheme to a second communication scheme of transmitting/receiving a request to/from the server device mutually; by a communication control unit of a server device which is connected to the gateway device connected to a controller and which is connected to a terminal device, switching communication with the gateway device to the second communication scheme; and when a management execution request requesting execution of a management process of managing the controller is received from the terminal device; by a management control unit, transmitting a session establishing request requesting establishment of a session with the controller, to the gateway device by the second communication scheme based on the received management execution request; and executing the management request against the controller through the session established by the gateway device, wherein the server device includes a program storage unit to store a plurality of programs which execute different processes individually, and wherein the terminal device transmits a request requesting execution of the management process, as the management execution request, the management process using at least one of the plurality of programs stored in the program storage unit.

* * * * *